(12) United States Patent
Philip

(10) Patent No.: US 6,726,086 B2
(45) Date of Patent: Apr. 27, 2004

(54) LIQUID PHASE DIFFUSION BONDING TO A SUPERALLOY COMPONENT

(75) Inventor: Vinod Mohan Philip, Winter Park, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 129 days.

(21) Appl. No.: 10/056,141

(22) Filed: Jan. 24, 2002

(65) Prior Publication Data

US 2003/0136811 A1 Jul. 24, 2003

(51) Int. Cl.$^7$ ................................................ B23K 1/00
(52) U.S. Cl. .................... 228/195; 228/248.5; 228/253; 228/111.5; 228/119
(58) Field of Search ................................ 228/193–195, 228/245–255, 111.5, 119; 29/889.1, 402.01

(56) References Cited

U.S. PATENT DOCUMENTS

| | | | |
|---|---|---|---|
| 4,008,844 A | * | 2/1977 | Duvall et al. ................. 228/119 |
| 4,096,615 A | * | 6/1978 | Cross ........................ 29/889.21 |
| 4,098,450 A | | 7/1978 | Keller et al. |
| 4,152,816 A | * | 5/1979 | Ewing et al. ................. 29/889.2 |
| 4,270,256 A | * | 6/1981 | Ewing ........................ 29/889.21 |
| 4,381,944 A | | 5/1983 | Smith, Jr. et al. |
| 4,493,451 A | | 1/1985 | Clark et al. |
| 4,650,109 A | * | 3/1987 | Crivella et al. .............. 228/194 |
| 4,676,843 A | | 6/1987 | Nazmy |
| 4,705,203 A | | 11/1987 | McComas et al. |
| 4,736,883 A | | 4/1988 | Morgan et al. |
| 4,804,815 A | | 2/1989 | Everett |
| 4,830,934 A | | 5/1989 | Ferrigno et al. |
| 5,086,968 A | | 2/1992 | Fawley et al. |
| 5,156,321 A | | 10/1992 | Liburdi et al. |
| 5,437,737 A | | 8/1995 | Draghi et al. |
| 5,524,695 A | * | 6/1996 | Schwartz ...................... 164/34 |
| 5,549,767 A | | 8/1996 | Pietruska et al. |
| 5,806,751 A | * | 9/1998 | Schaefer et al. ............. 228/119 |
| 5,956,845 A | | 9/1999 | Arnold |
| 6,195,864 B1 | | 3/2001 | Chesnes |
| 6,508,000 B2 | * | 1/2003 | Burke et al. ................ 29/889.1 |
| 6,575,349 B2 | * | 6/2003 | Van Esch .................... 228/119 |

* cited by examiner

Primary Examiner—M. Alexandra Elve

(57) ABSTRACT

A method for the manufacturing or repair of a superalloy gas turbine component including a liquid phase diffusion bonding process wherein the brazing heat treatment used for the diffusion bonding of a powder material to the component is accomplished by a heat cycle that is performed on the component for another purpose. A manufacturing solution heat treatment, a pre-weld heat treatment, a post-weld heat treatment, or a rejuvenating heat treatment may be used as the brazing heat treatment. The composition of the powder material is selected so that a desired set of material properties is achieved when the powder material is subjected to the dual-purpose heat cycle. In one embodiment, a 50/50 mixture of AM775 and IN939 powder is diffusion brazed to an IN939 superalloy component using a heat treatment which also functions as the post-casting solution heat treatment for the IN939 component.

13 Claims, No Drawings

LIQUID PHASE DIFFUSION BONDING TO A SUPERALLOY COMPONENT

FIELD OF THE INVENTION

This application applies generally to the field of metallurgy, and more specifically to the manufacturing and repair of alloy articles, and in particular, to the manufacturing and repair of a superalloy component of a gas turbine engine.

BACKGROUND OF THE INVENTION

High temperature cobalt-based and nickel-based superalloys are commonly used in the manufacture of gas turbine engine components, including combustors, rotating blades and stationary vanes. During the operation of these components in the harsh operating environment of a gas turbine, various types of damage and deterioration of the components may occur. For example, the surface of a component may become cracked due to thermal cycling or may be eroded as a result of impacts with foreign objects and corrosive fluids. Furthermore, such components may be damaged during manufacturing operations even prior to entering service. Because the cost of gas turbine components made of cobalt-base and nickel-base superalloys is high, repair of a damaged or degraded component is preferred over replacement of the component.

Several repair techniques have been developed for various applications of superalloy materials. Fusion welding of superalloy materials is known to be a difficult process to control due to the tendency of these materials to crack at the area of the weld site. However, with careful pre-weld and post-weld stress relief, control of welding parameters, and selection of welding materials, repair welds can be performed successfully on superalloy components.

Brazing is also commonly used to join or to repair superalloy components. One limitation of brazing is that brazed joints are typically much weaker than the base alloy, and so they may not be appropriate in all situations, such as repairs on the most highly stressed areas of the component.

Another process that has been used successfully for repair and material addition to superalloy components is known by several different names: diffusion bonding; diffusion brazing; and liquid phase diffusion sintering. These names generally refer to a process wherein a powdered alloy is melted at a temperature that is less than the liquidous temperature of the base alloy and allowed to solidify to become integral with the component. The powdered alloy typically includes particles of a high strength alloy, for example the same alloy as is used to form the base component, along with particles having a lower melting temperature than the high strength alloy, for example the base alloy with a melting point depressant such as boron. The component and powder are subjected to a heat cycle, often called a brazing heat treatment, wherein the temperature is selected so that the braze material having a lower melting temperature will become liquid and will wet the surfaces of the high melting temperature particles and base alloy. The component is held at this elevated temperature for a sufficient interval to promote liquid phase sintering. Liquid phase sintering is a process whereby adjacent particles in a powder mass are consolidated by diffusion through a liquid phase present between the particles. This diffusion process is also known as sintering. As the melting point depressant diffuses away from the braze area, the liquid material will solidify to form the desired joint or material addition to the component. A further post-braze diffusion heat treatment may be applied at a somewhat lower temperature to further drive the melting point depressant away from the braze and to more fully develop the desired material properties. Such a liquid phase diffusion bonding process is capable of forming a joint with material properties approximating those of the base alloy.

The cost of manufacturing and repair of a superalloy component is directly related to the time necessary to accomplish the manufacture or repair. The various thermal processes necessary to develop the desired material properties in a superalloy component all require a significant amount of time, ranging form a few hours to a day or more for each heat cycle. These thermal processes may include an original manufacturing solution heat treatment performed after the material is cast, a pre-weld heat treatment, a post-weld heat treatment, a brazing heat treatment for liquid phase diffusion bonding, and a post-brazing diffusion heat treatment. A method that reduces the time necessary for manufacturing or repair of a superalloy component is needed.

SUMMARY OF THE INVENTION

A method for manufacturing a gas turbine component is described herein as including: casting an alloy material to form a component; performing a solution heat treatment on the component; subjecting the component to an operating environment; applying an alloy powder mixture to the component; and bonding the alloy powder mixture to the component by liquid phase diffusion bonding using a brazing heat treatment that incorporates the solution heat treatment, the alloy powder mixture selected to achieve a desired material property when exposed to the brazing heat treatment. In one embodiment, the alloy material is selected to be IN 939; the alloy powder mixture is selected to be a 50/50 ratio by weigh percent of IN 939 and AM 775 alloys; the solution heat treatment is performed as heating the component to 2,120° F. for four hours followed by cooling to below 1,000° F. in twenty minutes or less; and the brazing heat treatment cycle is performed as heating the component to 2,120° F. for four hours, cooling the component to 2,050° F. and holding for four hours, followed by cooling from 2,050° F. to below 1,000° F. in twenty minutes or less.

A method is further described as including: casting an alloy material to form a component; applying an alloy powder mixture to the component; and performing a solution heat treatment cycle on the component, the solution heat treatment cycle functioning as a brazing heat treatment for bonding the alloy powder mixture to the component by liquid phase diffusion bonding, the powder mixture selected to achieve a desired material property when subjected to the solution heat treatment cycle.

In another embodiment, a method of repairing a component is described as including: applying a first alloy powder mixture to a component formed of an alloy material; bonding the first alloy powder mixture to the component by liquid phase diffusion bonding using a first brazing heat treatment that accomplishes bonding between the first alloy powder mixture and the component by liquid phase diffusion bonding and that also accomplishes a pre-weld stress relief in the component; and performing a welding process on the component after the step of bonding.

A method is also described as including the steps of: performing a welding process on a component formed of an alloy material; applying an alloy powder mixture to a portion of the component; and bonding the alloy powder mixture to the component by liquid phase diffusion bonding using a brazing heat treatment that accomplishes liquid phase diffusion bonding between the alloy powder mixture and the component and that also accomplishes a post weld stress relief in the component. In one embodiment, the brazing heat treatment may be selected to incorporate a manufacturing solution heat treatment used to form the component.

DETAILED DESCRIPTION OF THE INVENTION

The applicant has discovered that it is possible to eliminate the time and expense of one of the heat treatment cycles that is normally required in a manufacturing or repair process involving liquid phase diffusion material addition to a superalloy component. This is accomplished by selecting the composition of the powders and the brazing heat cycle used to achieve a desired material property in such a manner so that the brazing heat cycle is essentially the same as or incorporates another one of the other heat cycles required for the component. In this manner, the two heat treatments may be accomplished during one heat cycle, thereby reducing the time and expense of performing two separate thermal processes on the component. Note that the phrase "essentially the same as" when used herein is meant to include those processes or materials that fall within the allowable range of variations that are normally accommodated by another process or material. For example, if a heat treatment is specified as being a given temperature ±10° F. for a given hold time, then a brazing heat treatment that falls within the ±10° F. temperature window for the same hold time would be considered to be essentially the same as the specified heat treatment. As used herein, the term "incorporates" means that a first heat treatment cycle encompasses all of the temperature, hold time and transient rate requirements specified in a second heat treatment cycle, so that the first heat treatment cycle accomplishes the material property changes that are the objective of the second heat treatment cycle.

By way of example, a component may be formed of a nickel-base superalloy such as IN 939 available from Inco Alloys International, Inc. having the following composition of elements with incidental amounts of impurities.

| ELEMENT | WT. % (range) |
|---|---|
| Chromium | 22.0–22.8 |
| Cobalt | 18.5–19.5 |
| Titanium | 3.6–3.8 |
| Aluminum | 1.8–2.0 |
| Tungsten | 1.8–2.2 |
| Niobium | 0.9–1.1 |
| Tantalum | 1.3–1.5 |
| Carbon | 0.13–0.17 |
| Zirconium | 0.14 maximum |
| Impurities | Boron, Iron, Sulfur, Silver, Bismuth, Silicon, Lead, Nitrogen |
| Nickel | balance |

One skilled in the art will understand that the actual percentages can be greater or less than these exemplary ranges, and that other suitable alloys may be used that have additional or different elemental compositions. Processes known in the art may be used to cast the component from the IN 939 alloy material. Investment casting is an advanced casting process wherein the part may be cast in near-net shape with an excellent surface finish. Complex components such as gas turbine blades and vanes are often cast using an investment casting process. To achieve a predetermined set of material properties, the cast material may be subjected to a solution heat treatment as part of the component manufacturing process. For example, the component may be held for four hours (±15 minutes) at a temperature of 2,120° F. in a vacuum of 0.3 Pa (2 micrometer Hg), with ten minute holds at each of 800° F. and 1,600° F. during the heat-up transient. The component is then cooled via inert gas cooling in the furnace at a controlled rate to below 1,000° F. in twenty minutes or less in order to precipitate the desired microstructural phases and to achieve the desired tensile strength, creep and fatigue properties.

While precision casting techniques can produce alloy components having near-net shape and requiring only minimal machining operations, it may be desirable in some applications to add material to the as-cast product in order to reach a final configuration. A liquid phase diffusion sintering process may be used to add such material. The applicant has found that when selecting the powder mixture to include AM 775 (commercially available under the designation AMDRY 775) and IN 939 in equal weight percentages, the desired material properties, up to 70% of those of the base IN 939 material, can be achieved by using a brazing heat cycle that incorporates the manufacturing solution heat treatment cycle. In particular, the peak temperature and holding period at the peak temperature is essentially the same for both the manufacturing solution heat treatment and the brazing heat treatment, and the rapid cool down to below 1,000° F. in twenty minutes or less is essentially the same for both purposes. The brazing heat treatment cycle may be specified to include a post-brazing diffusion step at a temperature somewhat below the peak solution heat treatment temperature, but above the critical aging precipitation temperatures. In this manner, the brazing heat treatment incorporates the solution heat treatment cycle and is essentially the same as the solution heat treatment cycle with regard to the important parameters affecting material properties. Accordingly, the manufacturing process may include the following steps:

cast component from IN 939 obtain 50/50 mixture of IN 939 high temperature melt powder and AM775 low temperature melt powder in −120+325 mesh size clean component surface as necessary apply powder mixture in dry form to cleaned component surface apply combined solution/braze heat treatment of 2,120° F. for four hours in vacuum of 0.3 Pa, holding for ten minutes at each of 800° F. and 1,600° F. during heat-up.

cool to 2,050° F. and hold for four hours in vacuum of 0.3 Pa for post-brazing diffusion heat treatment cool from 2,050° F. to below 1,000° F. using inert gas cooling in twenty minutes or less cool to room temperature The above-described material and processing technique may be useful for producing gas turbine parts such as vanes, ring segments and combustor transition pieces, for example. Judicious selection of the powder mixture allows the single thermal cycle to be applied as both the manufacturing solution heat treatment and the liquid phase diffusion bonding braze heat treatment, thereby eliminating the necessity for two separate heat cycles. The liquid phase diffusion bonding process is purposefully designed to utilize a brazing heat treatment that incorporates the established manufacturing solution heat treatment for the base material in order to permit the combining of these two thermal operations.

For superalloy components that have already been placed into service, a liquid phase diffusion sintering process may be used to repair service related defects. An IN 939 component may be repaired with the powder mixture of 50/50 IN 939 and AM775 described above using a brazing heat treatment that incorporates a heat cycle that is essentially the same as the original manufacturing solution heat treatment. In this manner, not only is the diffusion bonding accomplished, but also the alloy material forming the component is rejuvenated to have material properties essentially the same as when the component was originally formed. Such a repair process for an IN 939 component may include the following steps:

- obtain 50/50 mixture of IN 939 high temperature melt powder and AM775 low temperature melt powder in −120+325 mesh size
- clean surface as necessary
- apply powder mixture in dry form to component surface areas needing repair
- shake component to ensure adequate filling of powder into voids being repaired
- apply combined braze/rejuvenation heat treatment of 2,120° F. for four hours in vacuum of 0.3 Pa, holding for ten minutes at each of 800° F. and 1,600° F. during heat-up.
- cool to 2,050° F. and hold for four hours in vacuum of 0.3 Pa for post-brazing diffusion heat treatment
- cool from 2,050° F. to below 1,000° F. using inert gas cooling in twenty minutes or less
- cool to room temperature The cleaning process to be used may be any cleaning process known in the art and appropriate for the surface geometry and type of surface contamination present on the component. For example, for a gas turbine part containing surface cracks, a hydrogen fluoride cleaning may be used to remove oxides from the component surface and from within the cracks. Such a process is known as fluoride ion cleaning (FIC) and it involves flowing hydrogen fluouride (HF) gas through a furnace to clean the exposed surfaces of the cracks. The fluoride ions from the HF gas reacts with the aluminum in the oxide scales and forms $AlF_3$ which, in turn, is liberated in the form of a gas. Once the aluminum is depleted from the oxide scale, the scale is easily removed and the crack surfaces are thereby cleaned.

The present invention may further be applied to reduce the time and cost associated with the repair of a component when both a fusion weld repair and a powder diffusion sintering process are used to accomplish the repair. One may envision a single component having service-related degradation that is most effectively repaired by making a weld repair on a first portion of the component and by making a liquid phase diffusion repair on a second portion of the component. This may occur when the part has cracks in the both the critical/high-stress areas as well as in the non-critical/low stress areas. The highly stressed areas may be repaired by a welding process while the lower stressed areas may be repaired by a brazing process. A larger amount of thermal stress would be induced in the part if only welding were to be used as compared to when a weld and braze combination is used. A pre-weld heat treatment is normally used in advance of a weld repair in order to minimize the risk of weld-induced cracking by re-dissolving (re-solutioning) the detrimental phases or precipitates that are generated within the alloy microstructure during the course of high temperature service exposure. It is possible to design a liquid phase diffusion repair process to include a brazing heat treatment cycle that is essentially the same as a pre-weld heat treatment regiment. Such a process may include the steps of:

- clean a component to remove service-induced contaminants
- obtain a predetermined powder mixture of a low melting temperature alloy powder and a high melting temperature alloy powder having a selected size range
- apply the powder mixture to a portion of the component surface
- bond the powder mixture to the component by liquid phase diffusion bonding using a combined brazing/pre-weld heat treatment heat cycle to achieve a predetermined material property in the component material
- perform a welding process on the component
- apply a post-weld heat treatment to the component A post-weld heat treatment is commonly applied to a component after a fusion welding process in order to reduce the stresses created in the heat affected zone as a result of the temperature transient created by the welding. Whereas the above-described procedure combined the pre-weld heat treatment and the liquid phase diffusion bonding brazing heat treatment, it is also possible to combine the liquid phase diffusion bonding brazing heat treatment with a post-weld heat treatment. Such a method may include the steps of:

- clean a component to remove service-induced contaminants
- perform a pre-weld heat treatment on the component
- perform a welding process on the component
- obtain a predetermined mixture of a low melting temperature alloy powder and a high melting temperature alloy powder having a selected size range
- apply the powder mixture to a portion of the component surface
- bond the powder mixture to the component by liquid phase diffusion bonding using a combined brazing/post-weld heat treatment heat cycle to achieve a predetermined material property in the component material This process may be implemented so that the combined brazing/post-weld heat treatment is also the same as a manufacturing solution heat treatment so that the single heat cycle also provides a rejuvenating effect to achieve material properties essentially the same as those provided in the as-manufactured component.

More than one application of powder alloy deposition may be desired, such as when material must be added on two different non-parallel surfaces of the component. In such cases, the pre-weld heat treatment may be designed to function as the brazing heat treatment for a first application of a powdered alloy, and the post-weld heat treatment may be designed to function as the brazing heat treatment for a second application of a powdered alloy, as described below.

- clean a component to remove service-induced contaminants
- obtain a first predetermined mixture of a low melting temperature alloy powder and a high melting temperature alloy powder having a selected size range
- apply the first powder mixture to a portion of the component surface
- bond the first powder mixture to the component by liquid phase diffusion bonding using a combined brazing/pre-weld heat treatment heat cycle to achieve a predetermined material property in the component material perform a welding process on the component obtain a second predetermined mixture of a low melting temperature alloy powder and a high melting temperature alloy powder having a selected size range apply the second powder mixture to a portion of the component surface bond the second powder mixture to the component by liquid phase diffusion bonding using a combined brazing/post-weld heat treatment heat cycle to achieve a predetermined material property in the component material The first powder mixture and the second powder mixture may have the same composition, and the brazing/pre-weld heat treatment heat cycle may be essentially the same as the combined brazing/post-weld heat treatment heat cycle.

One skilled in the art may appreciate that this invention may be applied to nickel-base alloys as well as cobalt-base alloys, or to any alloy manufacturing or repair process where a liquid phase diffusion bonding process is used to add material or to repair defects on a component. By selecting braze powder materials and mixtures that provide a desired material property when subjected to a brazing heat treatment that is the same as or incorporates another heat treatment scheduled to be performed on the component, a time and cost saving process may be implemented wherein the brazing heat treatment and the other scheduled heat treatment are implemented in a single heating cycle. Advantageously, a brazing heat treatment may be selected to be the same as or to incorporate and established manufacturing solution heat treatment, a pre-weld heat treatment, a post-weld heat treatment, and/or a rejuvenating heat treatment.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A method comprising:
casting an alloy material to form a component;
performing a solution heat treatment on the component;
subjecting the component to an operating environment;
applying an alloy powder mixture to the component; and
bonding the alloy powder mixture to the component by liquid phase diffusion bonding using a brazing heat treatment that incorporates the solution heat treatment, the alloy powder mixture selected to achieve a desired material property when exposed to the brazing heat treatment, and further comprising:
selecting the alloy material to be IN 939;
selecting the alloy powder mixture to be a 50/50 ratio by weight percent of IN 939 and AM 775 alloys;
performing the solution heat treatment as heating the component to 2,120° F. for four hours followed by cooling to below 1,000° F. in twenty minutes or less; and
performing the brazing heat treatment cycle as heating the component to 2,120° F. for four hours, cooling the component to 2,050° F. and holding for four hours, followed by cooling from 2,050° F. to below 1,000° F. in twenty minutes or less.

2. A method comprising:
casting an alloy material to form a component;
performing a solution heat treatment on the component;
subjecting the component to an operating environment;
applying an alloy powder mixture to the component; and
bonding the alloy powder mixture to the component by liquid phase diffusion bonding using a brazing heat treatment that incorporates the solution heat treatment, the alloy powder mixture selected to achieve a desired material property when exposed to the brazing heat treatment, and further comprising performing a welding process on the component after the step of bonding, wherein the brazing heat treatment functions as a pre-weld heat treatment for the welding process.

3. A method comprising:
casting an alloy material to form a component;
performing a solution heat treatment on the component;
subjecting the component to an operating environment;
applying an alloy powder mixture to the component; and
bonding the alloy powder mixture to the component by liquid phase diffusion bonding using a brazing heat treatment that incorporates the solution heat treatment, the alloy powder mixture selected to achieve a desired material property when exposed to the brazing heat treatment, and further comprising performing a welding process on the component before the step of bonding, wherein the brazing heat cycle functions as a post-weld heat treatment for the welding process.

4. A method comprising:
casting an alloy material to form a component;
applying an alloy powder mixture to the component; and
performing a solution heat treatment cycle on the component, the solution heat treatment cycle functioning as a brazing heat treatment for bonding the alloy powder mixture to the component by liquid phase diffusion bonding, the powder mixture selected to achieve a desired material property when subjected to the solution heat treatment cycle, and further comprising:
selecting the alloy material to be IN 939;
selecting the alloy powder mixture to be a 50/50 ratio by weigh percent of IN 939 and AM 775 alloys;
performing the solution heat treatment as heating the component to 2,120° F. for four hours, cooling the component to 2,050° F. and holding for four hours, followed by cooling from 2,050° F. to below 1,000° F. in twenty minutes or less.

5. A method comprising:
casting an alloy material to form a component;
applying an alloy powder mixture to the component; and
performing a solution heat treatment cycle on the component, the solution heat treatment cycle functioning as a brazing heat treatment for bonding the alloy powder mixture to the component by liquid phase diffusion bonding, the powder mixture selected to achieve a desired material property when subjected to the solution heat treatment cycle, and further comprising:
exposing the component to a high temperature operating environment after the step of performing a solution heat treatment cycle;
applying a second alloy powder mixture to the component;
applying a brazing heat treatment cycle to the component to bond the second alloy powder mixture to the component by liquid phase diffusion bonding, the brazing heat cycle selected to incorporate the solution heat treatment cycle and the second powder mixture selected to achieve a desired material property when subjected to the brazing heat treatment cycle.

6. A method comprising:

applying a first alloy powder mixture to a component formed of an alloy material;

bonding the first alloy powder mixture to the component by liquid phase diffusion bonding using a first brazing heat treatment that accomplishes bonding between the first alloy powder mixture and the component by liquid phase diffusion bonding and that also accomplishes a pre-weld stress relief in the component; and performing a welding process on the component after the step of bonding.

7. The method of claim 6, further comprising:

selecting the alloy material to be IN 939;

selecting the alloy powder mixture to be a 50/50 ratio by weigh percent of IN 939 and AM 775 alloys; and performing the first brazing heat treatment as heating the component to 2,120° F. for four hours, cooling the component to 2,050° F. and holding for four hours, followed by cooling from 2,050° F. to below 1,000° F. in twenty minutes or less.

8. The method of claim 7, wherein the first brazing heat treatment is selected to incorporate a manufacturing solution heat treatment used to form the component.

9. The method of claim 6, further comprising:

applying a second alloy powder mixture to the component; and bonding the second alloy powder mixture to the component by liquid phase diffusion bonding using a second brazing heat treatment that accomplishes bonding between the second alloy powder mixture and the component by liquid phase diffusion bonding and that also accomplishes a post-weld stress relief in the component.

10. The method of claim 9, wherein the second alloy powder mixture is selected to have essentially the same composition as the first alloy powder mixture and the second brazing heat treatment is selected to be essentially the same as the first brazing heat treatment.

11. A method comprising:

performing a welding process on a component formed of an alloy material;

applying an alloy powder mixture to a portion of the component; and bonding the alloy powder mixture to the component by liquid phase diffusion bonding using a brazing heat treatment that accomplishes liquid phase diffusion bonding between the alloy powder mixture and the component and that also accomplishes a post weld stress relief in the component.

12. The method of claim 11, further comprising:

selecting the alloy material to be IN 939;

selecting the alloy powder mixture to be a 50/50 ratio by weigh percent of IN 939 and AM 775 alloys; and performing the brazing heat treatment as heating the component to 2,120° F. for four hours, cooling the component to 2,050° F. and holding for four hours, followed by cooling from 2,050° F. to below 1,000° F. in twenty minutes or less.

13. The method of claim 11, wherein the brazing heat treatment is selected to incorporate a manufacturing solution heat treatment used to form the component.

\* \* \* \* \*